I

United States Patent [19]
Schroter et al.

[11] Patent Number: 5,850,542
[45] Date of Patent: Dec. 15, 1998

[54] MICROPROCESSOR INSTRUCTION HEDGE-FETCHING IN A MULTIPREDICTION BRANCH ENVIRONMENT

[75] Inventors: David A. Schroter; A. James Van Norstrand, both of Round Rock, Tex.

[73] Assignee: International Business Machines Corporation, Armonk, N.Y.

[21] Appl. No.: 528,905

[22] Filed: Sep. 15, 1995

[51] Int. Cl.[6] ...................................................... G06F 9/38
[52] U.S. Cl. ............................................ 395/582; 395/586
[58] Field of Search ..................................... 395/586, 581, 395/582

[56] References Cited

U.S. PATENT DOCUMENTS

| | | | |
|---|---|---|---|
| 4,943,908 | 7/1990 | Emma et al. | 395/587 |
| 4,991,080 | 2/1991 | Emma et al. | 395/382 |
| 5,634,103 | 5/1997 | Dietz et al. | 395/582 |

*Primary Examiner*—William M. Treat
*Assistant Examiner*—Kenneth R. Coulter
*Attorney, Agent, or Firm*—Anthony V. S. England; Andrew J. Dillon

[57] ABSTRACT

An apparatus for fetching instructions in a computer system is disclosed. The apparatus includes a cache circuit for holding a sub-set of main store, a buffer circuit for holding instructions fetched from the cache for dispatch to a plurality of execution units, and a branch resolution unit. A first tag associated with each instruction to be dispatched is generated that identifies the instruction while it is in process. The execution units execute dispatched instructions and provide resulting condition codes and first tag for each instruction that is completed. The branch resolution unit, fetches a not guessed instruction stream from the cache such that the not guessed instruction stream is available to the instruction buffer during the same cycle that the guess is resolved. The branch resolution unit also includes means for guessing the result of a branch instruction and means for fetching a guessed instruction stream to be fetched.

11 Claims, 3 Drawing Sheets

Fig. 1 *Prior Art*

MICROPROCESSOR INSTRUCTION HEDGE-FETCHING IN A MULTIPREDICTION BRANCH ENVIRONMENT

BACKGROUND OF THE INVENTION

1. Technical Field

The present field relates to the field of data processing and, more particularly, to predicting the outcome of conditional branches, either taken or not taken, in the processor of a computer. More specifically still, the present invention relates to recovering from a wrong prediction along conditional branches as efficiently as possible.

2. Description of the Prior Art

In most high performance processors, pipelining is used as a means to improve performance. Pipelining allows a processor to be divided into separate components where each component is responsible for completing a different phase of an instruction's execution. For example, a typical pipeline in a processor comprises five (5) basic components. The components are: Instruction fetch (stage I), instruction decode and address generation (stage II), operand fetch (stage III), instruction execution (stage IV), and put away the results (stage V). Each instruction enters the pipeline and ideally spends one cycle at each stage of the pipeline. Individually, each instruction takes five cycles to pass through the pipeline. However, if the pipeline can be kept full then each component of the processor (pipeline stage) can be kept actively working on a different instruction, each at a different pipeline stage, and one instruction can complete in every cycle. Unfortunately, keeping the pipeline full is a difficult task. Breaks in the pipeline, disruptions, frequently occur and result in idle cycles that can delay an instruction's execution.

The branch instruction is one of the major causes of a pipeline disruption. The branch instruction introduces a temporary uncertainty into the pipeline because, in order to keep the pipeline full, the processor must guess which one of two possible instructions enters the pipeline next; the fall through instruction or the target of the branch. Most high performance processors will guess the outcome of the branch before it executes and then proceed to fetch and decode instructions down the path that is guessed (either taken or not taken).

By attempting to predict the outcome of the branch, the processor can keep the pipeline full of instructions and, if the outcome of the branch is guessed correctly, avoid a pipeline disruption. If the branch was guessed incorrectly, for example guessed not taken and the branch is actually taken, then any of the instructions that entered the pipeline following the branch are canceled and the pipeline restarts at the correct instruction.

To reduce the penalty of bad branch prediction, many superscaler machines have incorporated "hedge fetching" instructions down the path not speculatively taken. These hedge-fetched instructions are held in a backup buffer until needed. When the guess of a branch is found to be incorrect at resolution time, the cache access time is saved by having the not-guessed path prefetched and waiting in the backup buffers.

Unfortunately, the backup buffers require valuable chip area and additional multiplexing for accessing. The backup buffers require more area based upon their depth or the number of buffers required. Thus, to be effective, a backup buffer should be as deep as the machine's dispatch window and one backup buffer is needed for each speculative path. Moreover, for optimum effectiveness, the buffer should be as deep as the branch scan window.

The additional multiplexing between the dispatch buffer and the primary instruction buffer (I-Buffer) also requires additional space on the chip's surface. This is so because the bus path must be extended from the cache to include the backup buffer to the primary I-Buffer. The use of backup buffers can double the multiplexing into each bit of an already congested primary I-Buffer.

Accordingly, what is needed is an improved hedge-fetching mechanism that reduces, if not eliminates, the need for additional buffers, and that further reduces the need for additional multiplexing. Furthermore, what is needed is an improved hedge-fetching mechanism that minimizes speculative guessing and optimizes error correction to return to the appropriate path.

SUMMARY OF THE INVENTION

It is therefore one object of the present invention to provide a data processing system.

It is another object of the present invention is to predict the outcome of conditional branches, either taken or not taken, in the processor of a computer.

It is yet another object of the present invention is to recover from a wrong prediction along conditional branches as efficiently as possible.

The foregoing objects are achieved as is now described. According to the present invention an apparatus for fetching instructions in a computer system is disclosed. The apparatus includes a cache circuit for holding a sub-set of main store, a buffer circuit for holding instructions fetched from the cache for dispatch to a plurality of execution units, and a branch resolution unit. A first tag associated with each instruction to be dispatched is generated that identifies the instruction while it is in process. The execution units execute dispatched instructions and provide resulting condition codes and first tag for each instruction that is completed. The branch resolution unit, fetches a not guessed instruction stream from the cache such that the not guessed instruction stream is available to the instruction buffer during the same cycle that the guess is resolved. The branch resolution unit also includes means for guessing the result of a branch instruction and means for fetching a guessed instruction stream to be fetched.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
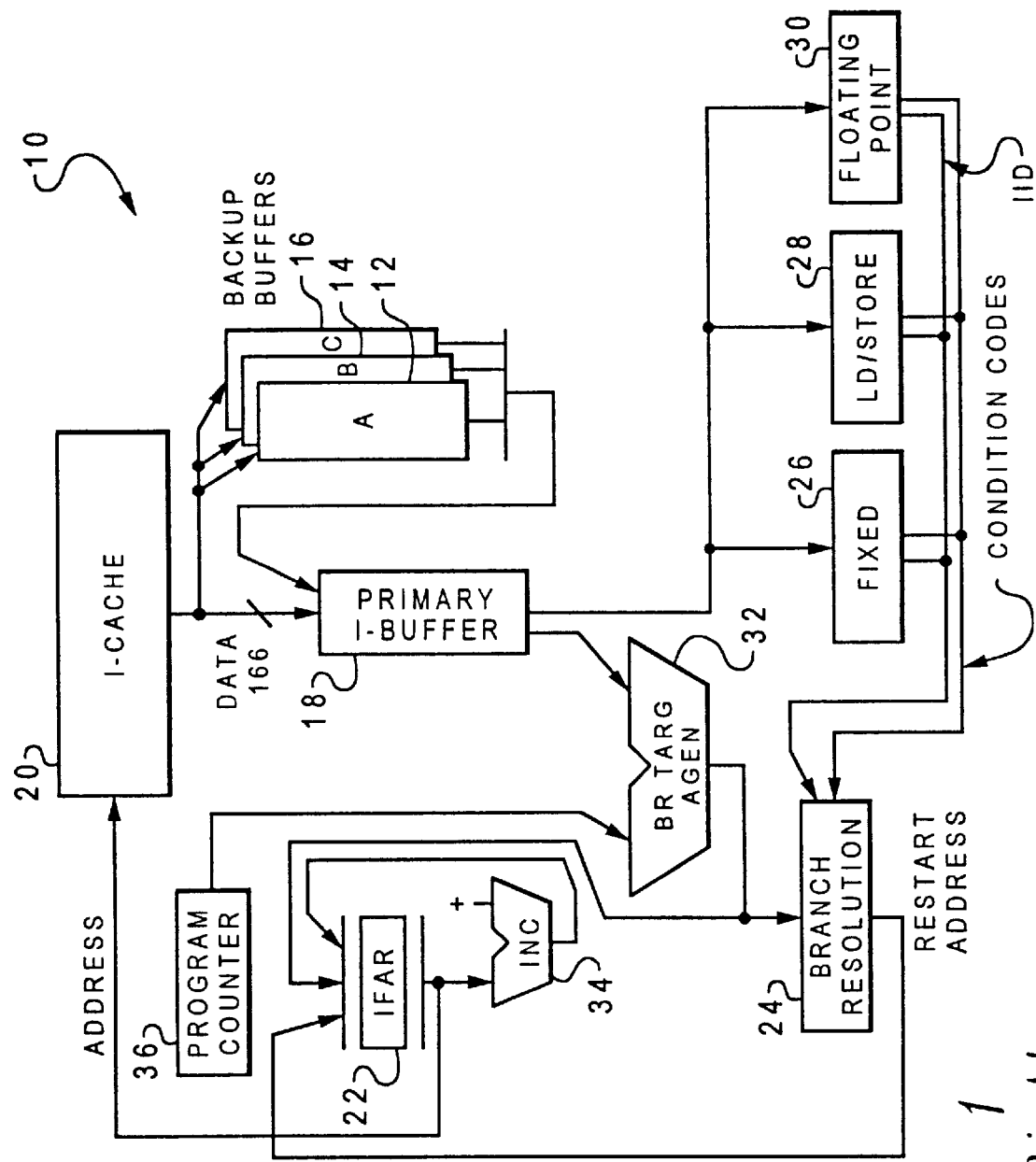
FIG. 1 depicts a prior art sample hedge-fetching cache arrangement.

To aid in the understanding of the present invention with respect to prior art solutions, a sample hedge-fetching cache arrangement is illustrated in the prior art diagram of FIG. 1 and described as follows. FIG. 1 shows a high-level view of a prior art implementation of a RISC-based hedge-fetching cache 10 having backup buffers 12, 14, and 16. An instruction set buffer (I-Buffer) 18 receives instruction data from the instruction cache 20 for speculative paths and backup buffers 12–16 provide the hedge-fetched instructions if the guess is resolved to be wrong. An instruction fetch address register (IFAR) 22 also uses a branch resolution logic unit 24 that provides speculative addresses, hedge-fetching addresses, and resolution of branches using facilities such as condition codes from fixed point execution unit 26, load/store (LD/store) unit 28, or floating point unit 30.

Branch resolution selects instruction addresses from those provided by branch target address adder (BR TARG AGEN) 32 and incrementer 34. For many branches, branch target adder 32 calculates the address of the target of the branch by adding a displacement, which is found in the branch instruction, to the address of the branch that is found in program counter 36. For other branches, the address is just the displacement found in the branch instruction. In a non-RISC-based hedge fetching cache, general purpose registers are used as input to the branch target adder. The incrementer provides the next sequential instruction address by incrementing the IFAR by the number of bytes fetched from the I-cache.

Branch resolution chooses the correct addressing path by using condition codes, with an instruction identifier (IID) tag, sent from any number of execution elements. FIG. 1 demonstrates such execution elements such as fixed point execution element 26, which processes fixed point arithmetic instructions, compares, and logical operations. Load/store unit 28 executes accesses to memory while floating point unit 30 executes floating point instructions.

TABLE 1 is an example instruction stream operating on the hedge-cache fetching cache unit 10 of FIG. 1. The instruction stream includes a fetch having 16 bytes where the branch is guessed not taken in Cycle 1.

TABLE 1

HEDGE FETCHING WITH BACKUP BUFFERS

INSTRUCTION STREAM:

| IID | ADDRESS | INSTRUCTION |
|-----|---------|-------------|
| 0 | 96 | ADD |
| 1 | 100 | BR -> 400 |
| • | • | • |
| • | • | • |
| • | • | • |
|   | 400 | MOVE |

GUESS = NOT TAKEN

| CYCLE | IFAR | DISPATCH | EXECUTE | RESOLVE | BACKUP |
|-------|------|----------|---------|---------|--------|
| 0 | 96 | — | — | — | — |
| 1 | NS | ADD, BR | — | — | — |
| 2 | 400 | NS | ADD | — | — |
| 3 | NS + 1 | NS + 1 | NS | BR | MOVE |
| 4 | NS + 2 | NS + 2 | NS + 1 | — | MOVE |
| 5 | 416 | MOVE | — | — | — |

The backup buffers are loaded with the branch taken path, which, in this example, is byte addresses 400–415, in Cycle 3 as a hedge against a bad guess. A backup buffer is needed for each speculative path that a machine might support. In Cycle 3, the branch is resolved as a wrong guess, the backup is loaded into I-Buffer 18 in Cycle 4 and dispatched in Cycle 5.

Figure 2:
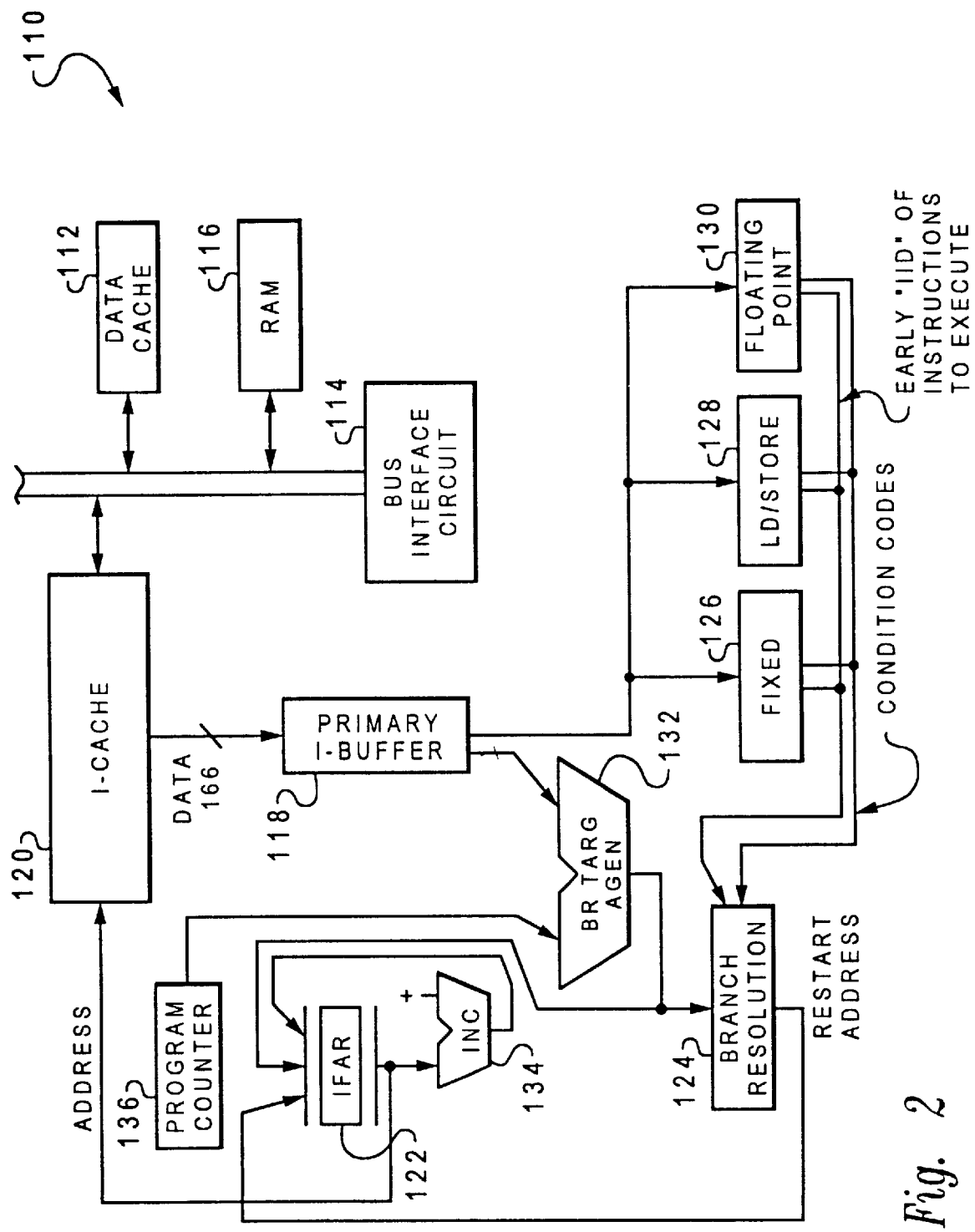
FIG. 2 depicts in accordance with a preferred embodiment of the present invention a JIT hedge fetching cache unit.

Instead of using backup buffers to hold the not-guessed path, just-in-time (JIT) hedge fetching provides the same ability to quickly change courses in the event of a wrong guess, but without the need for maintaining an alternative path in backup buffers. An example of a JIT hedge fetching cache unit 110 that is used in the present invention is shown in FIG. 2. FIG. 2 illustrates JIT hedge fetching cache 110 that includes an instruction cache unit 120, coupled to a data cache 112 via a bus interface circuit 114 and also to the main memory (RAM) 116 for retrieving and storing data and instructions.

Just-in-time hedge fetching is performed by having the instructions of the not-guessed path arrive from the cache in the cycle that a branch is resolved. In this way, the instructions are sent from instruction cache 120 to primary I-Buffer 118 so I-Buffer 118 can elect to receive them in the cycle that the resolution is determined. This timing is achieved by receiving information from the execution units concerning which instructions they will execute next.

In a speculative machine, an instruction identifier (IID) tag is assigned each instruction at dispatch time in program order. The IID tag of the nearest condition code-setting instruction preceding the branch instruction is associated with the IID tag sent to the branch resolution logic, along with other condition codes, by the execution units 126, 128, or 130. When branch resolution logic 124 receives the IID tag of its dependency instruction, it knows then that it will resolve the branch, has a test-dependent condition code, in the next cycle.

In preparation, branch resolution logic 124 initiates a just-in-time (JIT) hedge fetch of the not-guessed path and, in the next cycle, the JIT instructions are loaded into the I-Buffer if the guess was wrong. TABLE 2 illustrates the branching and prediction taken according to the JIT solution as compared to the instruction stream shown in TABLE 1 shown for the prior art I-cache system of FIG. 1. In the JIT solution, the IID is referred to as an early IID and is supplied to branch resolution logic 124 well before the conventional designated time in the prior solutions. In this case, the IID is sent in cycle 1 while the condition code is sent late in cycle 2 (ADD item in EXECUTE column). Alternatively, the IID can be sent early in the same cycle as the condition code, which would then be sent at the end of the cycle. As in the previous case, the guessed, or not-taken path is dispatched to one of execution units 126, 128, or 130; however, instead of fetching the not-guessed path in Cycle 2, the not-guessed path is fetched in Cycle 4, which is just in time for dispatch in Cycle 5, if needed.

TABLE 2

JUST-IN-TIME HEDGE FETCHING

INSTRUCTION STREAM:

| IID | ADDRESS | INSTRUCTION |
|-----|---------|-------------|
| 0 | 96 | ADD |
| 1 | 100 | BR -> 400 |
| • | • | • |
| • | • | • |
| • | • | • |
|   | 400 | MOVE |

GUESS = BR NOT TAKEN

| CYCLE | IFAR | DISPATCH | EXECUTE | RESOLVE | IID* |
|-------|------|----------|---------|---------|------|
| 0 | 96 | — | — | — | — |

TABLE 2-continued

JUST-IN-TIME HEDGE FETCHING

| 1 | NS     | ADD, BR | —      | —  | 0 |
|---|--------|---------|--------|----|---|
| 2 | NS + 1 | NS      | ADD    | —  | — |
| 3 | NS + 2 | NS + 1  | NS     | BR | — |
| 4 | 400    | NS + 2  | NS + 1 | —  | — |
| 5 | 416    | MOVE    | —      | —  | — |

*IID of instruction-setting condition code is sent to the Branch Resolution logic with the condition code.

Figure 3:
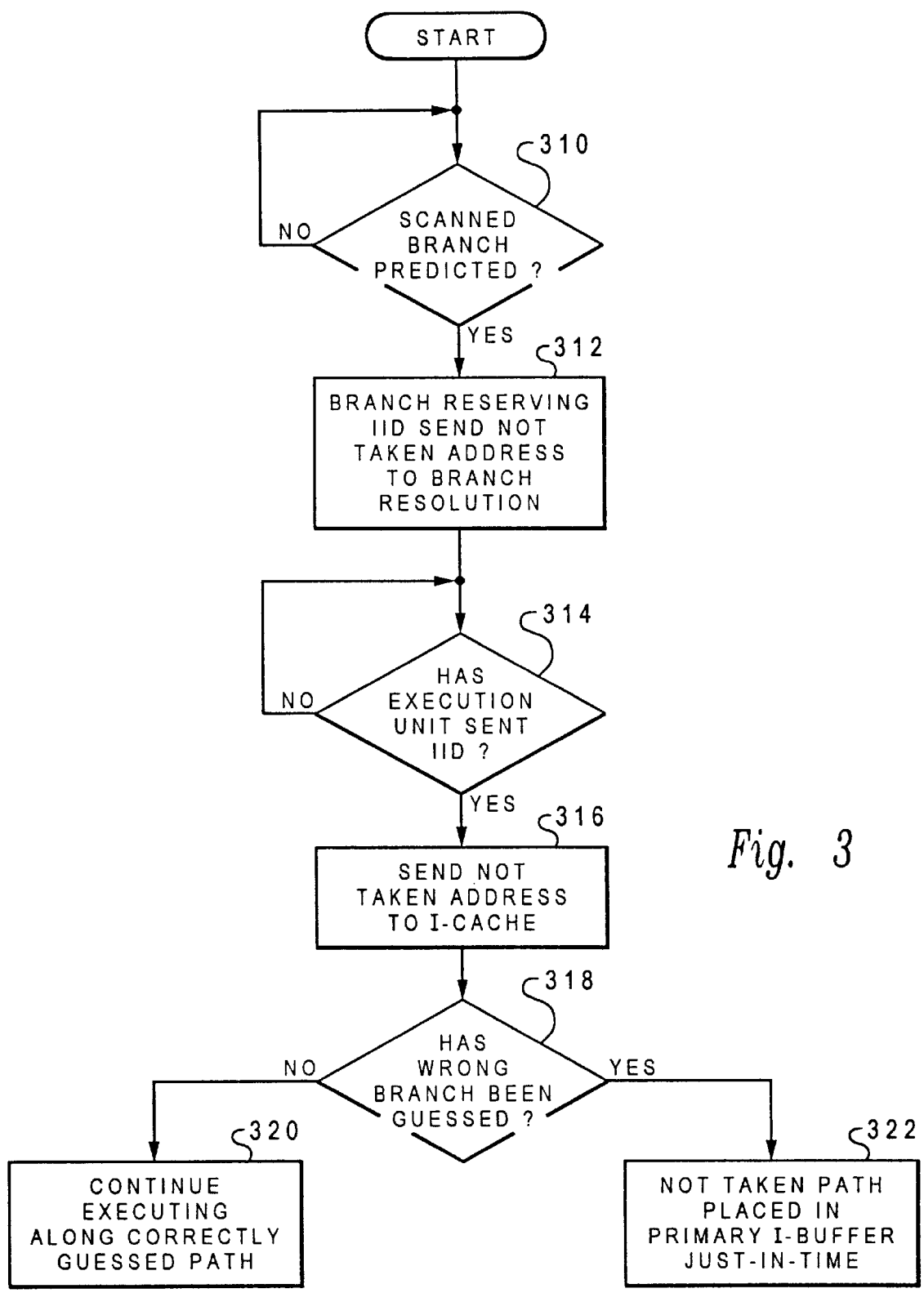
FIG. 3 depicts a flow chart of a sample just-in-time hedge fetching operation.

FIG. 3 depicts a flow chart of a sample just-in-time hedge fetching operation as executed by cache 110. In block 310, the system scans for a branch predicted. Once a branch predict has been scanned, the system, in block 312, branches to resolve the issued IID and then send the not taken address to branch resolution logic 124. Once resolved, the system, in block 314, attempts to resolve the IID sent from one of the execution units 126, 128, or 130. Afterwards, in block 316, the system then sends the not taken address to the cache. In block 318, the system determines if the wrong branch has been guessed. If the wrong branch has been guessed, the system, in block 320, places the not taken path in primary I buffer 118 just-in-time. If the right branch has been selected, the system, in block 322, continues execution along the correctly guessed path.

The just-in-time hedge fetching is an improvement over the prior art's solution in that it eliminates the need for valuable real estate on the chip to include additional backup buffers. Further, the JIT hedge fetching reduces the amount of multiplexing in front of the I-Buffer data path. Additionally, the JIT hedge fetching delays the actual hedge fetching in time that, in machines with a high-cache bandwidth, allows multiple fetches down the guess path to occur before the hedge fetch is performed. This enables the system to reduce instruction buffer empty time over machines that hedge fetch at dispatch time.

Furthermore, the JIT hedge-fetching solution eliminates backup buffer to primary buffer "stitching." For example, in RISC machines, branch scanning is often performed. Due to the branch scanning, the following situation may occur: A branch is scanned and guessed; then, a conditional stream is started for the instructions after the branch. Before the branch is actually dispatched, the branch is resolved. In this case, the instructions in the primary I-Buffer before and including the branch need to stay in place and be dispatched, while the backup buffer needs to be "stitched" in behind the nondispatched instructions. Stitching is the event where a branch is guessed incorrectly, but the instructions in the not taken path in the backup buffer are not the next to dispatch. In this case, the backup buffer cannot be mapped position for position into the primary I-buffer. Instead, each backup buffer slot can go into X, which is the branch scan window −1, primary I-buffer positions. For example, the primary I-buffer contains the following:

```
add
add
branch
load
load
load
```

The first load cannot dispatch because of an interlock, load element busy, the branch in scanned and guessed not taken, the taken path is fetched and put into a backup buffer. The taken path is made of all Move instructions . . . . Before we resolve the branch we have the following condition:

```
add        move
add        move
branch     move
load       move
load
load
```

If the dispatch conflict still exists when the branch is resolved incorrectly the first move instruction has to replace the first add and not go in the first slot of the primary ibuffer, the last two moves would be lost and the next address would have to be recalculated.

This can be accomplished by stitching at resolution time or waiting until the primary buffer runs dry and then moving the backup instructions over. Stitching at resolution time leads to increased primary I-Buffer mixing. Waiting until the branch dispatches generates potential dispatch windows where less than the maximum number of instructions can be dispatched to cycle before the stitching. This problem is eliminated using JIT hedge fetching according to the present invention.

While the invention has been particularly shown and described with reference to a preferred embodiment, it will be understood by those skilled in the art that various changes in form and detail may be made therein without departing from the spirit and scope of the invention.

What is claimed is:

1. A cache system for fetching instructions, comprising:
   an instruction cache unit that holds a set of instructions to be executed, including at least one branch instruction;
   a primary buffer unit that holds instructions fetched from said instruction cache unit;
   a plurality of execution units that execute various dispatched instructions and provide resulting condition codes and an instruction identification tag for each instruction being executed; and
   a branch resolution unit coupled to said plurality of execution units and responsive to a guess of a branch instruction and said instruction identification tag for each instruction being executed for fetching a not-guessed instruction stream from said instruction cache unit in response to an imminent completion of said guessed branch instruction such that said not-guessed instruction stream arrives at said primary buffer unit during a clock cycle that said guessed branch instruction is resolved.

2. The invention of claim 1 further comprises:
   an instruction fetch address register, coupled to said branch resolution unit, for providing said not-guessed instruction.

3. The invention of claim 1 further comprising:
   means, coupled to said branch resolution unit, for determining a branch target address for said not-guessed instruction.

4. The invention of claim 1 wherein any of said execution units performs either fixed-point calculations, load or store operations, or floating point calculations.

5. An apparatus for fetching instructions comprising:
   a cache circuit for holding a sub-set of main store;
   a buffer circuit for holding instructions fetched from said cache for dispatch to a plurality of execution units including at least one branch instruction;
   a tag associated with each instruction to be dispatched that identifies the instruction while it is in process;

said plurality of execution units for executing dispatched instructions and providing resulting condition codes and said tag for each instruction that is completed; and a branch resolution unit coupled to said plurality of execution units and responsive to a guess of a branch instruction and said tag for each tag being executed for fetching a non-guessed instruction stream from said instruction cache unit in response to an imminent completion of said guessed branch instruction such that said non-guessed instruction stream arrives at said buffer circuit during a clock cycle that said branch instruction is resolved.

6. The invention of claim 5 wherein said branch resolution unit comprises:

means for guessing the result of a branch instruction; and means for fetching a guessed instruction stream to be fetched.

7. The invention of claim 5 further comprises:

an instruction fetch address register, coupled to said branch resolution unit, for providing said not-guessed instruction.

8. The invention of claim 5 further comprising:

means, coupled to said branch resolution unit, for determining a branch target address for said not-guessed instruction.

9. The invention of claim 5 wherein any of said execution units performs either fixed-point calculations, load or store operations, or floating point calculations.

10. The invention of claim 5 wherein said tag is an identification tag and is provided at least one cycle before said condition code.

11. The invention of claim 5 wherein said tag is an identification tag and is provided in the same cycle as, but earlier than, said condition code.

* * * * *